United States Patent [19]
Slautterback

[11] 3,937,636
[45] Feb. 10, 1976

[54] BATTERY WITH RECESSED TERMINALS AND FUSE

[75] Inventor: Robert C. Slautterback, Toledo, Ohio

[73] Assignee: Eltra Corporation, Toledo, Ohio

[22] Filed: June 12, 1975

[21] Appl. No.: 586,432

[52] U.S. Cl. .............. 136/135 S; 136/170; 136/181
[51] Int. Cl.² ......................................... H01M 2/30
[58] Field of Search ......... 136/135 S, 181, 166, 170

[56] References Cited
UNITED STATES PATENTS

| | | |
|---|---|---|
| 1,321,960 | 11/1919 | Wheat.................................. 136/181 |
| 3,370,988 | 2/1968 | Morton................................ 136/181 |
| 3,647,556 | 3/1972 | Cox..................................... 136/170 |
| 3,689,322 | 9/1972 | Lindenberg et al. ............ 136/135 S |

*Primary Examiner*—Donald L. Walton
*Attorney, Agent, or Firm*—Robert H. Johnson

[57] ABSTRACT

A wet cell battery has a plurality of covered recesses in the top. Positive and negative terminals extend into two of the recesses. A two-conductor cable which extends out of the recesses is connected to the terminals and includes a fuse which is disposed in one of the recesses.

17 Claims, 10 Drawing Figures

BATTERY WITH RECESSED TERMINALS AND FUSE

BACKGROUND OF THE INVENTION

The field of art to which this invention relates includes batteries, and more specifically batteries with current protection systems.

Wet cell batteries are increasingly being used as portable sources of power in many applications. As such uses of batteries increase, efforts also are being made to protect the battery from misuse and make the battery safer to use.

A common problem involved with the use of a battery is the grounding or short-circuiting of the current conductor leading from the battery to the device being powered. Thus, it is a principal object of my invention to provide protection in the event of grounding or short-circuiting of the cable.

It is a further object of my invention to isolate the terminals to which the cable is connected from any strain resulting from tension applied to the cable.

SUMMARY OF THE INVENTION

In carrying out my invention in a preferred embodiment, there is provided a battery container with a cover. The cover includes a plurality of covered recesses connected by channels and a slot which communicates with one of the recesses. Terminals extend into two of the recesses. A two-conductor cable is connected to the terminals and extends out through the slot where it is held substantially in place due to a ninety degree bend in it caused by a member connected to the container and disposed in the slot. One of the conductors in the cable includes a replaceable fuse disposed in one of the recesses.

The above and other objects, features and advantages of my invention will be more easily understood by persons skilled in the art when the detailed description is taken in conjunction with the drawing.

DESCRIPTION OF THE PREFERRED EMBODIMENT

Figure 1:
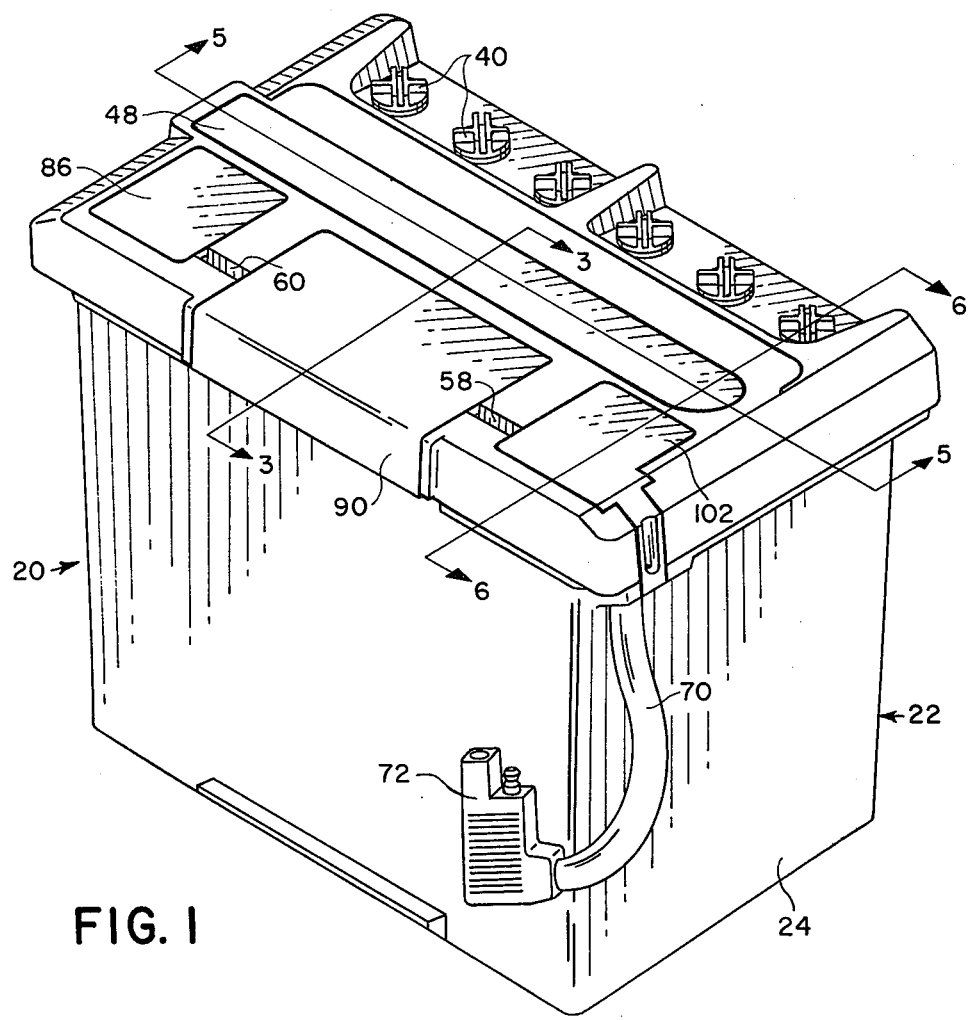
FIG. 1 is a front quarter perspective view of a wet cell battery embodying my invention.
Figure 2:
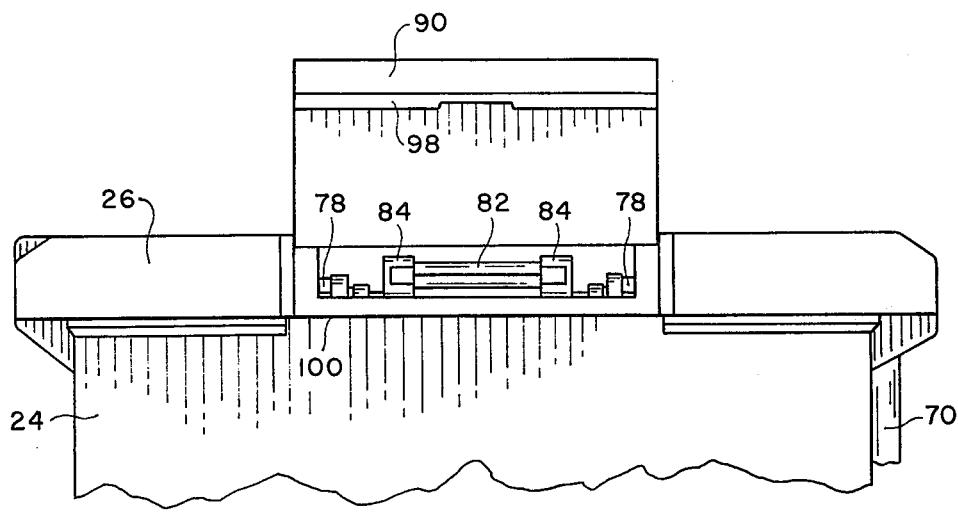
FIG. 2 is a fragmentary front elevational view with the cap for the fuse recess in an open position.

Referring now to the drawing, the reference numeral 20 denotes a wet cell battery of the lead acid type, although it will be apparent to persons skilled in the art that my invention is applicable to batteries other than the lead acid type. Battery 20 includes a case 22 which is made up of a container 24 to which a cover 26 is connected, preferably by heat sealing. Both container 24 and cover 26 preferably are polypropylene or other suitable acid-resistant plastics or materials.

Figure 4:
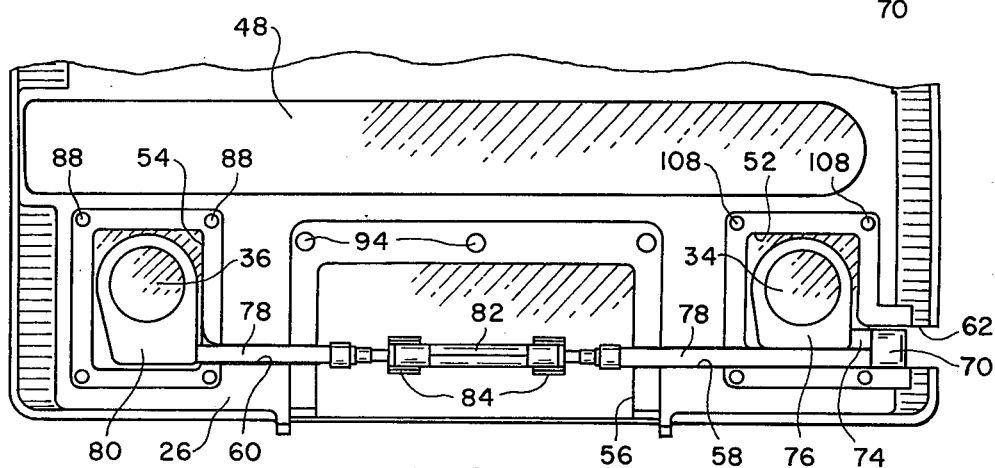
FIG. 4 is a fragmentary plan view showing the terminal recesses and the fuse recess with the caps removed.
Figure 5:
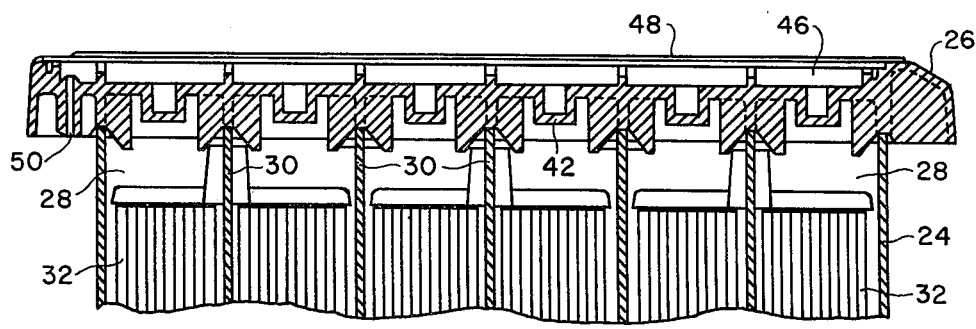
FIG. 5 is a fragmentary sectional view taken along line 5—5 of FIG. 1.
Figure 6:
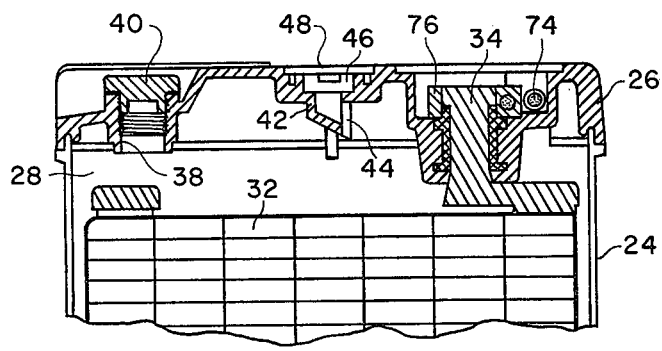
FIG. 6 is a fragmentary sectional view taken along line 6—6 of FIG. 1.

Container 24 has the shape of a parallelepiped and is divided into a plurality of cells 28 by cell walls 30 (best seen in FIG. 5). Disposed in each cell 28 is a pack 32 of interleaved positive and negative plates, like plates of one pack 32 being connected to like plates of a pack 32 in an adjacent cell 28 by means of an intercell connection such as described in U.S. Pat. No. 3,793,086. The negative plates of the pack in one end cell 28 are connected to a terminal post 34, as shown in FIG. 6. Similarly, the positive plates of pack 32 in the opposite end cell 28 are connected to a terminal post 36, as shown on FIG. 4. Each cell 28 is filled with dilute sulphuric acid or other suitable electrolyte sufficiently to cover the pack 32 of plates in the respective cell. Communication with the interior of each cell 28 is through an opening 38 (FIG. 6) in cover 26 which normally is closed by means of a removeable cover 40 which threadably engages opening 38.

As is well known, lead acid batteries generate gases during operation, and so some provision must be made to vent these gases from the individual cells 28. In the present battery 20 this is accomplished by a series of vent members 42, one of which is disposed in each cell 28. Each vent member 42 includes an opening 44 which communicates the interior of cell 28 with the respective vent member 42.

The various vent members 42 are interconnected by means of a manifold formed by a recess 46 in cover 26 and a cap 48 which covers recess 46. At one end of the manifold there is provided a passage 50 to which a flexible tube (not shown) may be conveniently attached in order to conduct the gases generated during operation of the battery away from the battery.

Figure 9:
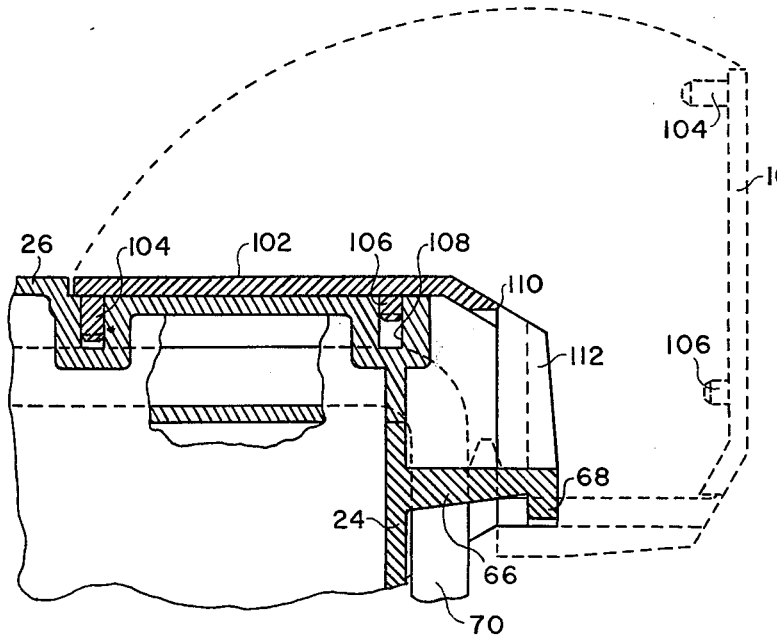
FIG. 9 is a fragmentary sectional view taken along line 9—9 of FIG. 8.
Figure 8:
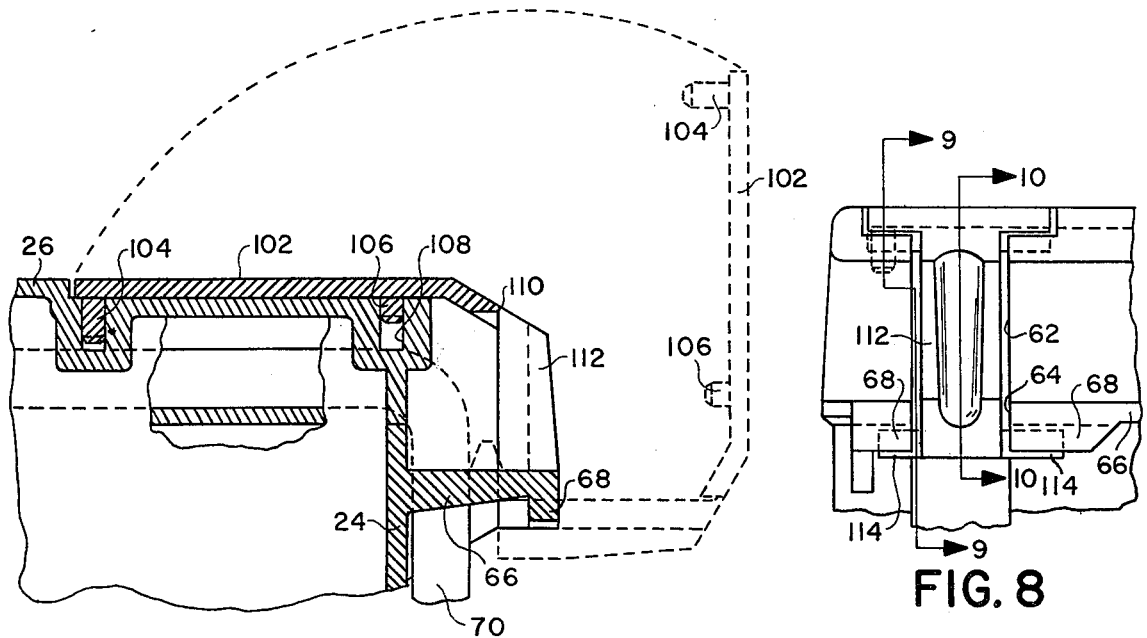
FIG. 8 is a fragmentary end view showing the connection of the terminal cap and member of FIG. 7 to the battery case.

Cover 26 includes a pair of recesses 52 and 54 into which the negative and positive terminal posts 34 and 36 extend, respectively, best shown in FIG. 4. Also provided in cover 26 is a recess 56 which is adapted to receive a fuse, as will be explained hereinafter. Running between recess 52 and recess 56 is a channel 58, and similarly a channel 60 runs between recess 54 and recess 56. Also, a slot 62 is cut in cover 26 between the outer edge thereof and recess 52. Slot 62 is aligned with a slot 64 cut in a flange 66 which extends outwardly from the side of container 24, best seen in FIGS. 8, 9 and 10. A pair of stops 68 integral with flange 66 and disposed adjacent each side of slot 64 are provided for a purpose to be explained shortly.

Connected to terminal post 34 and 36 is a flexible two-conductor cable 70 provided with a suitable connector 72 at the end remote from the terminal post connections. Cable 70 includes an insulated conductor 74 which has a cast-on lead terminal ring 76 that is burned or welded to the lead terminal post 34 to provide an electrical connection between post 34 and conductor 74. It will be noted that terminal ring 76 is disposed within recess 52 and that conductor 74 runs from recess 52 out through slot 62. Similarly, cable 70 includes an insulated conductor 78 at one end of which there is a cast-on lead terminal ring 80 which is burned or welded to post 36 to provide an electrical connection between conductor 78 and terminal 36. Conductor 78 includes a fuse 82 which is disposed in recess 56 and removably held in place by a pair of spring clamp connectors 84. At this point it will be noted that terminal ring 80 is disposed within recess 54 and that conductor 78 extends from recess 54 through channel 60, recess 56, channel 58, recess 52 and slot 62 from which it emerges through slot 64, together with conductor 74 as cable 70.

Figure 3:
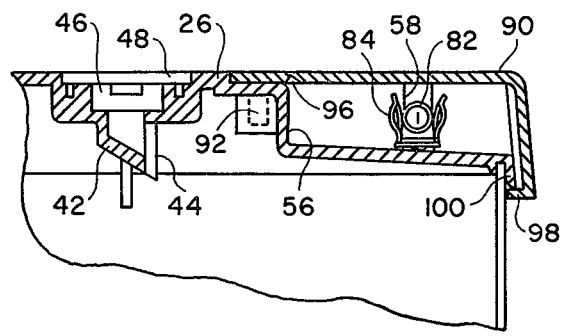
FIG. 3 is a fragmentary sectional view taken along line 3—3 of FIG. 1.

In the normal operation of battery 20 all of the recesses are covered by separate caps. Recess 54 is covered by a cap 86 which is connected to cover 26 by a plurality of pins (not shown) which extend from the bottom thereof and engage holes 88 in cover 26. Also, recess 56 is covered by a cap 90 which is connected to cover 26 by means of a plurality of pins 92 which project downwardly therefrom and engage suitable holes 94 in cover 26. Cap 90 is provided with a so-called "living hinge" at 96 which is formed by providing a reduced cross-sectional area at 96. Cover 90 is provided with a lock to hold it in the closed position shown in FIG. 3 by means of an inwardly extending flange portion 98 which engages a part of the bottom edge 100 of cover 26. Recess 52 is covered by cap 102 which is connected to cover 26 by a plurality of pins 104 and 106 which project downwardly therefrom and cooperate with a plurality of holes 108 and cover 26.

Figure 10:
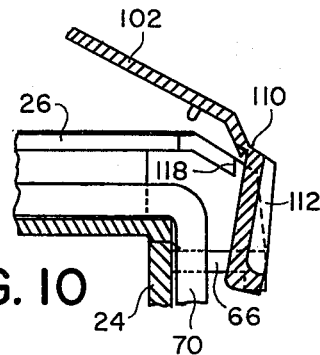
FIG. 10 is a fragmentary sectional view taken along line 10—10 of FIG. 8 showing the position of the terminal cap and attached member just prior to connection of the cap to the battery cover.
Figure 7:
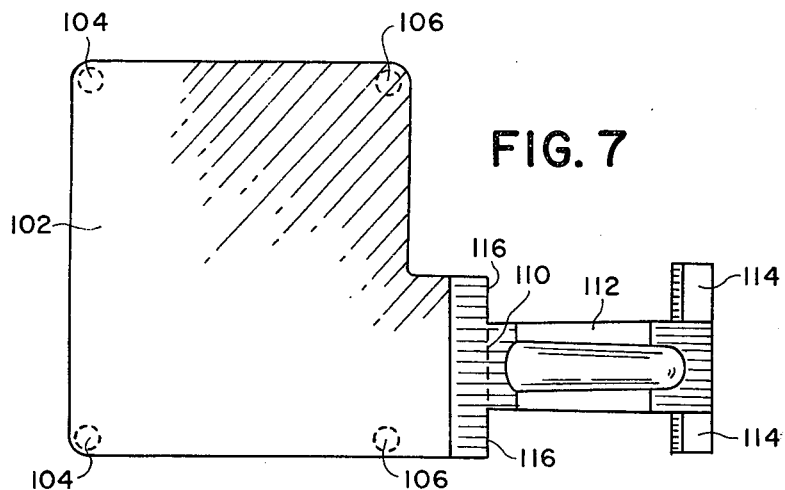
FIG. 7 is an enlarged plan view of a terminal cap with attached member.

Connected to cap 102 by a so-called "living hinge" 110 is a member 112 from which a pair of pins 114 extend at the end remote from hinge 110. Member 112 is arranged to be disposed in slots 62 and 64 with pins 114 engaging flange 66 and held by stops 68 so that the lower end of member 112 is pivotally anchored to container 24. With member 112 pivotally anchored to container 24 cap 122 is pivoted from the dotted outlined position shown in FIG. 9 to substantially the position shown in FIG. 10 where the edge 116 (FIG. 7) of cap 102 engages notches 118 in cover 26 adjacent each side of slot 62, as best seen in FIG. 10. Cap 102 is then pivoted further downwardly from the position shown in FIG. 10 to the solid line position shown in FIG. 9 where pins 104 and 106 engage holes 108. It will be noted that pins 106 are somewhat shorter than pins 104 in order to facilitate engagement with holes 108. When cap 102 is in the position shown in FIG. 9 member 112 is in the solid line position also shown in FIG. 9 and functions to interfere with cable 70 so that it is forced downwardly through slots 62 and 64, as shown, in a substantially ninety degree bend. As a consequence cable 70 is held substantially in place and any tension that is applied to cable 70, as might occur if someone were to attempt to carry battery 20 by cable 70, will be preventing, at least partially, from being transmitted to the connection between conductor 74 and lead ring 76. This is desirable because while the electrical integrity of the connection between lead ring 76 and conductor 74 may be good, the mechanical integrity may be poor with the result that if substantial tension applied to cable 70 is fully transmitted to the connection between conductor 74 and lead ring 76, it may fail.

At this point it will be noted that I have provided a battery which is protected by a recessed and covered fuse and recessed and covered terminals and conductors so that if there is a short circuit or a ground to the exposed portion of cable 70, the battery will be protected by fuse 82.

The above detailed description is intended to be illustrative only. My invention is subject to various modifications, changes and the like without departing from the scope and spirit of it. Consequently, the limits of my invention should be determined from the claims appended hereto.

What is claimed is:

1. A battery comprising a case, said case including recess means, first and second terminals extending into said recess means, first conductor means connected to said first terminal and extending out of said recess means, said first conductor means including a fuse disposed in said recess means, second conductor means connected to said second terminal and extending out of said recess means, and means for substantially covering said recess means.

2. A battery as set forth in claim 1 wherein said recess covering means is partially removeable so as to provide access to said fuse.

3. A battery as set forth in claim 1 including means which cooperates with said case to reduce transmission of strain to said terminal means due to a pull on said conductor means.

4. A battery comprising a case, said case including recess means, at least one terminal extending into said recess, first conductor means connected to said terminal and extending out of said recess means, said conductor means including a replaceable fuse disposed in said recess means, and means for substantially covering said recess means.

5. A battery as set forth in claim 4 wherein said recess covering means is at least partially removeable so as to provide access to said fuse.

6. A battery as set forth in claim 4 including means which cooperates with said case to hold said conductor means substantially in place.

7. A battery comprising a case, said case including a container and a cover sealingly connected to said container, said cover including recess means, at least one terminal extending into said recess means, conducting means connected to said terminal and extending out of said recess means, said conducting means including a replaceable fuse disposed in said recess means, and means connected to said top for substantially covering said recess means.

8. A battery as set forth in claim 7 wherein said recess covering means is at least partially removable so as to provide access to said fuse.

9. A battery as set forth in claim 7 including means which cooperates with said case to hold said conducting means substantially in place.

10. A battery comprising a case including a container and a cover sealingly connected to said container, said cover including first and second terminal recesses, a fuse recess, first and second channels connecting said fuse recess with said first and second terminal recesses, respectively, a slot communicating with said second terminal recess, a cap for covering said first terminal recess, a cap for covering said second terminal recess, and a cap for covering said fuse recess, a first terminal extending into said first terminal recess, a second terminal extending into said second terminal recess, first conductor means connected to said first terminal and extending from said first terminal recess through said first channel into said fuse recess and from said fuse recess through said second channel, said second terminal recess and said slot, said first conductor means including a removeable fuse disposed in said fuse recess, and second conductor means connected to said second terminal and extending out through said slot.

11. A battery as set forth in claim 10 including means connected to said second cap which covers said slot and cooperates with said case to hold said conductor means substantially in place.

12. In a battery, the combination comprising a case, said case having a recess and a slot communicating with said recess, a terminal extending into said recess, a flexible conductor connected to said terminal and extending out through said slot, a cap connected to said case and covering said recess and a member connected to said cap and connected to said case so that it interfers with said conductor and causes a substantially ninety degree bend in said conductor as it passes through said slot.

13. In a battery, the combination comprising a case having a container and a cover on said container, said cover having a recess and a slot between the outer periphery thereof and said recess, a terminal extending into said recess, a flexible cable extending from said recess out through said slot, said cable including a conductor connected to said terminal, a cap which is connected to said cover and covers said recess, a member hingedly connected to said cap and anchored to said container so that it interfers with said cable and causes a substantially ninety degree bend in said cable where it passes through said slot.

14. The combination as set forth in claim 13 wherein the means for anchoring said member includes a flange extending from said container, a slot in said flange in alignment with said first-mentioned slot, a stop on said flange adjacent each side of said second-mentioned slot, a pair of pins which extend from said member and engage said flange adjacent said second-mentioned slot and inwardly of said stops so that said member is anchored to said container.

15. The combination as set forth in claim 13 wherein the means for connecting said cap to said cover includes at least one hole in said cover and a pin which extends from said cap and cooperates with said hole.

16. The combination as set forth in claim 13 including a pair of notches adjacent said slot which are engaged by the edge of said cap.

17. In a battery, the combination comprising a case having a container and a cover on said container, said container having an outwardly extending flange, a first slot in said flange and a pair of stops on said flange adjacent each side of said first slot, said cover having a recess, a plurality of holes adjacent said recess, a second slot between the outer periphery thereof and said recess in alignment with said first slot and a pair of notches adjacent said recess on each side of said second slot, a cable extending from said recess out through said slots, said cable including a conductor connected to said terminal, a cap which has an edge that engages said notches and a plurality of pins that cooperate with said holes to connect said cap to said cover, a member hingedly connected to said cap, said member having a pair of pins which engage said flange on each side of said first slot inwardly of said stops so that said member is anchored to said container in such a manner that it interfers with said cable and causes a substantially 90° bend in said cable where it passes through said second slot.

* * * * *